United States Patent Office 3,205,495
Patented Sept. 7, 1965

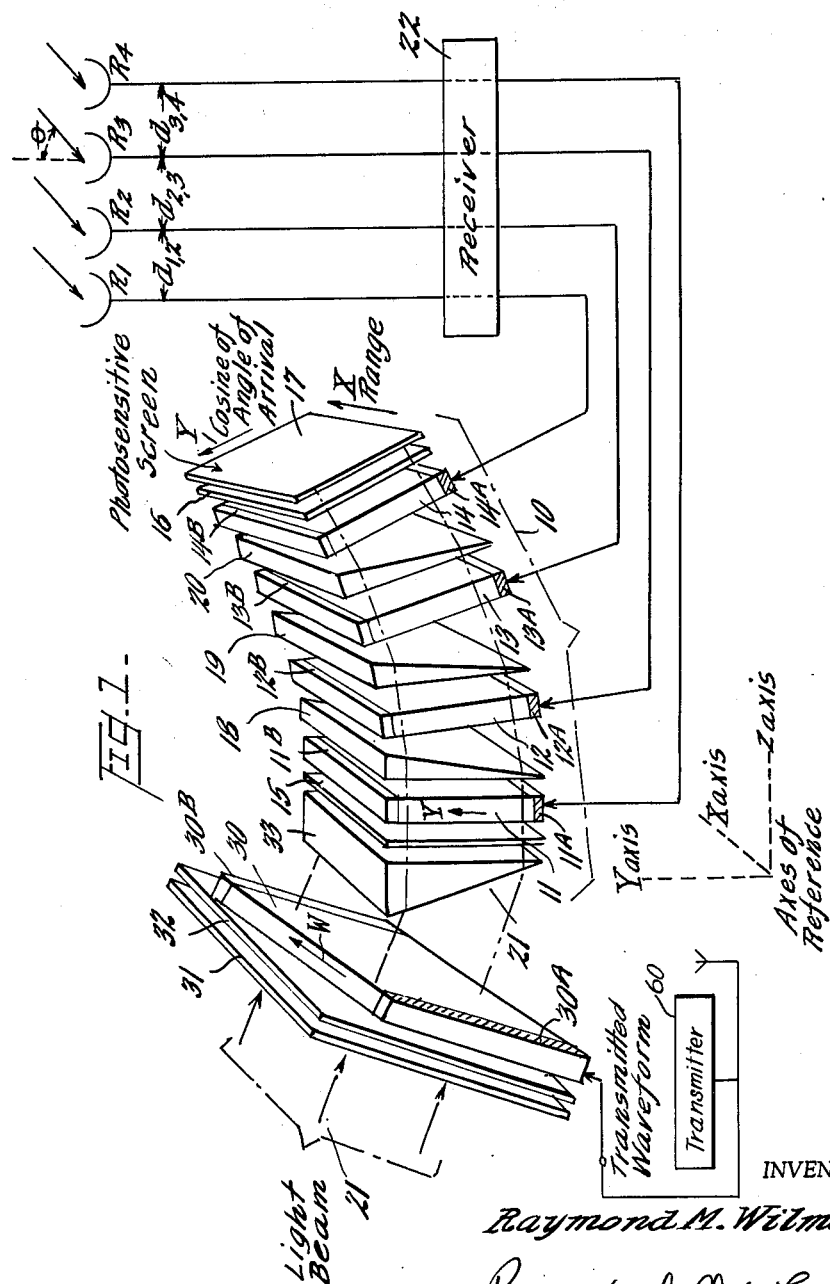

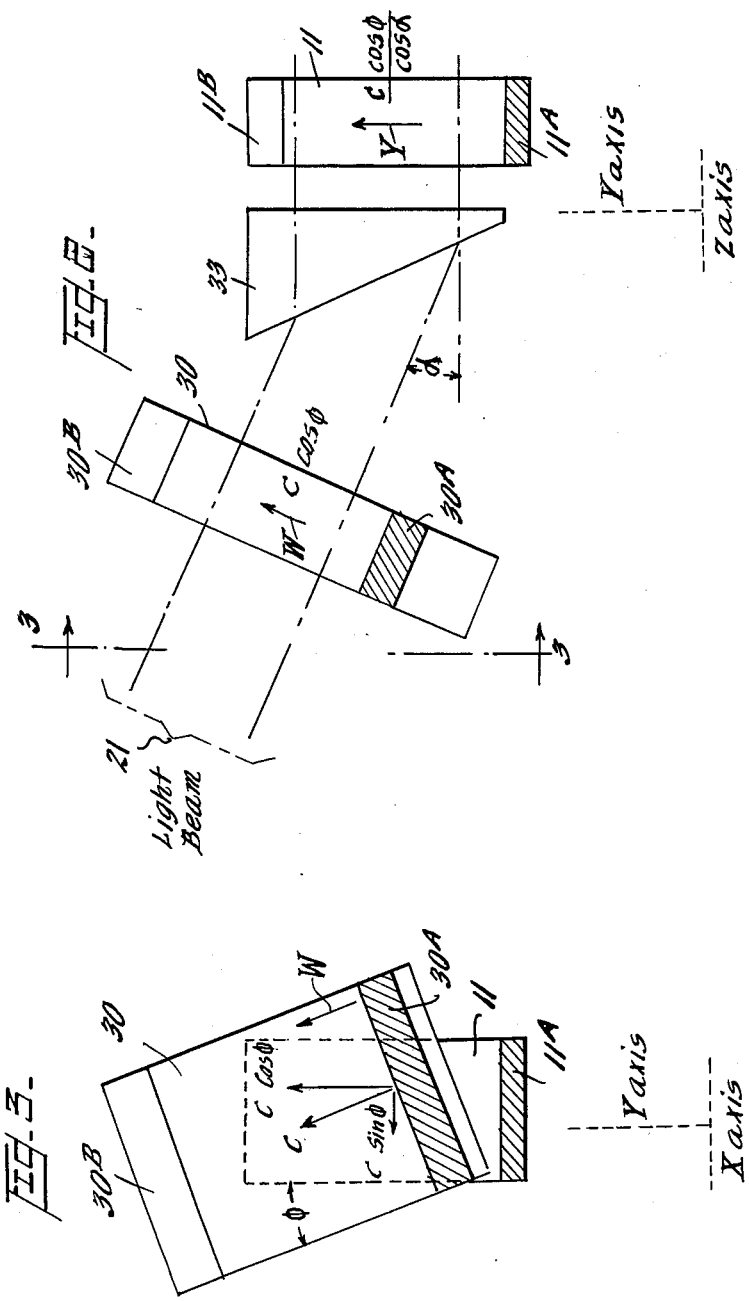

3,205,495
OPTICAL PROCESSING OF INFORMATION
Raymond M. Wilmotte, 68 Mountain Ave., Princeton, N.J.
Filed Apr. 6, 1962, Ser. No. 185,766
18 Claims. (Cl. 343—11)

The present invention relates to the field of information processing, particularly by means of optical cross-correlation techniques in a manner which permits analysis of at least two independent information parameters simultaneously. The invention also relates to the measurement of a parameter of information embodied in the actual time delays between three or more signals which have substantially similar waveforms, and wherein the signals are delayed relative to each other in known ratios. This invention is described herein with particular reference to radar and the processing of radar information, to obtain an indication or measure of target bearing and range, and velocity if desired; however, the application of the invention to radar is only exemplary, in order to facilitate a complete understanding of the invention and its operation, and it is not to be construed as limited to this application.

For purposes of illustrating this invention an optical correlating tool which may be utilized in practicing this invention is a transparent, ultrasonic bi-refractive, solid delay line. The delay line is associated with a transducer for converting an electrical signal into a corresponding ultrasonic or acoustic energy wave, as the intelligence or information input to the line; while a beam of polarized light is applied through the delay line transversely thereof and is modified or modulated by the sonic energy of the intelligence input. The sonic energy of the input signal travels down the delay line, and the stresses introduced by this energy cause a bi-refractive effect on the polarized light passing through the delay line, which is analyzed by a polarizer oriented at right angles to the initial polarization of the applied light. The light pattern emerging from the analyzing polarizer is therefore modulated in a manner definitive of the sonic energy waveform on the delay line. This modulation of the light at any particular instant for a given point along the delay line is a function of the ultrasonic signal or waveform present at that point. Thus, the intensity of light passed by the system at any selected point along the delay line varies in time in accordance with the input signal as the signal passes down the delay line. Likewise, the emergent overall light intensity pattern for the entire length of the delay line corresponds to the ultrasonic waveform present along the line at any particular instant, and this overall emergent light pattern of course varies in time in accordance with a continuing information or input signal to the line.

If two delay lines are employed, and arranged so that the incident light passes transversely through both lines serially, while a first input signal is applied to one delay line transducer and a second input signal is applied to the other delay line transducer, the light output of the combined system is the cross-correlation function of the two input signals, and obtains a maximum time integrated light output for the system where the waveforms on the two delay lines are identical and in spatial registry along their respective lines. Thus, if a signal is transmitted for radar purposes having a waveform $f_T(t)$ (which may be a pulse, or other waveform such as a random noise signal), in a time period thereafter the echo signal is received from a target and it has a waveform $f_R(t)$. The received signal may be identical to the transmitted signal, or it may vary therefrom by a Doppler frequency if there is relative motion between the radar station and the target. In accordance with the present invention, the transmitted signal is applied to one delay line transducer, while the received signal is applied to the other delay line transducer. The maximum integrated light intensity pattern emergent from the system appears at the point along the delay lines where registering portions of the two traveling waveforms $f_T(t)$ and $f_R(t)$ obtain identity, or are most nearly identical, or where the received signal obtains maximum correlation with the transmitted signal. Since the point along the delay lines where this identity or maximum correlation occurs is a function of the time delay between application of the two signals to their respective delay lines, this point is a measure of the range of the target. Similarly, in the case of two identical received signals $f_{R_1}(t)$ and $f_{T_2}(t)$ which are received at different times, the time difference or time delay between these signals can be measured in the same manner as for the signals $f_T(t)$ and $f_R(t)$.

In accordance with the prior art, systems of the general type described above are arranged or designed so that the transmitted and received signals travel in opposite directions along their respective delay lines, and the point of maximum correlation being detected as identical portions of the two signals cross each other spatially in their respective delay lines. In my copending application S.N. 130,010, filed August 8, 1961, now Patent No. 3,111,666 and entitled Method and Apparatus for Optically Processing Information, systems are there described and claimed wherein two time displaced signals are correlated while traveling in the same direction in their respective delay lines, but with the received or time delayed signal traveling in its delay line at what may be considered an effective or an apparent greater velocity than the transmitted or base signal in its delay line. Thus, although the two signals are caused to travel in the same direction along their respective delay lines, spatial coincidence or registry is nevertheless obtained between corresponding portions of the two signals, and the point of coincidence along the delay line system constitutes a measure of the time delay between the two signals.

What has herein been termed an "effective" or "apparent" greater velocity for the delayed signal than for the earlier signal in the respective delay lines, is accomplished in accordance with my said copending application by interposing an optical system between the two delay lines so as to compress the light pattern emergent from the first signal delay line in the length or signal traveling dimension thereof. This compressed light pattern is then passed through the second or received signal delay line thereby effecting a lesser operational length for the second delay line. Thus, although the actual signal velocity along the second delay line may be the same as that along the first, the time of traverse of a given signal along its effectively shorter length of delay line is less than the time of traverse of the earlier signal along its effectively longer length of delay line. By selecting an appropriate ratio of first to second delay line effective lengths, a desired ratio of spatial scale to actual time delay between the two signals may of course be obtained from the system.

The present invention embodies in part an adaptation of the foregoing systems wherein certain information is embodied in the time delay between two signals, and in part embodies an expansion of these systems for the simultaneous measurement of multiple parameters. In radar one may seek numerous information parameters, such as target range, target bearing, and target velocity. In its specific exemplary embodiment, the present invention enables the determination of all these parameters, essentially simultaneously and by use at least in part of the delay line electro-optical techniques mentioned above. To this end, the radar application of the invention contemplates the use of a plurality of radar receiving antennae spaced from each other, preferable in a line. Information on the bearing of a target from this antenna array is embodied in the time delays between the receipt of a given echo signal from the target at each of the receiving antennae, as is understood in the radar art. The present invention contemplates correlating a plurality of such received signals by the electro-optical sonic delay line techniques above-mentioned, and utilizing the time delays between the received signals to define the angle of receipt of the signals, or of target bearing. This correlation is effected on one axis of the delay line system. The present invention further contemplates the simultaneous measurement of target range in the same electro-optical correlation system, by effecting a range signal correlation on a second axis of the delay line system. Inherent in the correlation output is a Doppler signal indicative of the target velocity, which can be readily detected and measured.

Accordingly, it is one object of the present invention to provide for the correlation of a plurality of signals, each time delayed with respect to the others, by electro-optical correlation techniques.

Another object of the present invention is to provide for such correlation involving three or more signals.

Another object of the present invention is to provide for the determination of the bearing of a target by radar, utilizing a plurality of spaced radar receiving antennae, and utilizing the relative time delays in reception of an echo signal from the target at the several antennae to obtain bearing information by electro-optical correlation of the signal as received at each antenna.

Another object of the present invention is to provide for the correlation of a plurality of signals, each time delayed with respect to the other, and each related to the same information parameter, and simultaneously correlating with said signals an additional signal relating to a different information parameter, said correlation being performed by electro-optical techniques.

Still another object of the present invention is to provide for said correlations with respect to two information parameters, and detecting a third information parameter embodied in the electro-optical correlation output.

And a further object of the present invention is to provide for said correlation and said detection, wherein said signals are derived from radar, and said information parameters are target bearing, target range, and target velocity.

Other objects and advantages of the present invention will become apparent from a consideration of the following detailed description of one exemplary specific embodiment of the invention, had in conjunction with the accompanying drawings, in which like numerals refer to like or corresponding parts, and wherein:

FIG. 1 is a perspective and schematic view of one system embodying the present invention, and illustrating its application to radar;

FIG. 2 is a detailed side elevational view of a portion of the system shown in FIG. 1; and FIG. 3 is a view of the detailed showing of FIG. 2, taken along the line 3—3.

In FIG. 1, the numeral 10 designates a four stage electro-optical correlator, consisting of four quartz ultrasonic delay line panels designated by numerals 11, 12, 13, and 14, sandwiched between two crossed light polarizer panels 15 and 16, and terminating in a light integrating screen 17, which might preferably be the photoconductive screen of a conventional television camera tube. Each delay line panel includes along one edge an electrical-sonic input transducer 11A, 12A, 13A, and 14A, and along its opposite edge a sonic energy absorber 11B, 12B, 13B, and 14B. Interposed between each two successive stages of the correlator 10 is an optical prism: 18 between stages 11 and 12, 19 between stages 12 and 13, and 20 between stages 13 and 14.

Apart from the rest of the system, the general operation of the correlator 10 will be described. Considering a single delay line first, e.g. line 11, an electrical signal applied to transducer 11A is converted to sonic energy, and is thus coupled into and travels down the delay line panel 11 in the direction of arrow Y to the absorber 11B, where the energy is absorbed to prevent reflections back down the line. Thus, if a varying signal is applied to 11A, that signal is distributed along and travels down line 11, creating a stress pattern along the line characteristic of the waveform applied thereto. This stress pattern is definitive of the fine structure as well as the envelope of the applied electrical signal, and of course keeps changing in accordance with the applied signal. Light beam 21 is applied transversely through the delay line 11 and is modulated by the sonic stresses in the line because of the birefractive nature of the material. Before reaching the delay line, light beam 21 is polarized by polarizer panel 15. Therefore, if a second polarizer panel, crossed with respect to panel 15, were positioned at the light output side of panel 11, the modulation of the light emerging from panel 11 would be thereby analyzed, and the instantaneous light pattern emergent from the analyzer polarizer would be definitive of the instantaneous signal or waveform present along the panel 11. The same applies with respect to each of the other stages 12, 13, and 14, and to their combined operation, each in turn modulating the light transmitted therethrough by beam 21, and the total modulation being analyzed and detected by means of polarizer plate 16.

It is contemplated in accordance with the present embodiment of the invention, as will be more apparent subsequently, that the signals applied to stages 11, 12, 13, and 14 will each be identical, except that they will be displaced in time, with the signal applied to stage 12 being delayed relative to that applied to 11, and the signal applied to 13 being delayed with respect to that at 12, and the signal at 14 being delayed with respect to that at 13. It is further contemplated that a correlation of all the signals will be had at some point along the Y axis of the delay lines. In order to obtain a correlation output, the four input signals must be brought into registry along their respective delay lines. This is caused by effectively or apparently speeding up the relative travel of each delayed signal relative to its earlier signal, thereby enabling a registration of all signals at some point along the Y axis of the delay line system. The effective speeding up of the delayed signals is accomplished by prisms 18, 19, and 20. The light image emerging from panel 11 is refracted by prism 18 in a manner to compress it along the Y axis as it is applied to panel 12. Thus, although the signal on panel 12 actually travels at the same rate as the signal on panel 11 along the respective lengths, the signal on panel 12 travels faster than the compressed optical image of the signal in panel 11 applied through the prism 18 to panel 12. Coincidence will accordingly be obtained between the waveforms on panels 11 and 12 at some point along the Y axis of the system, providing maximum correlation between the two signals at such point. The location of this point along the Y axis is a measure of the time delay between the two signals. Similarly, the resultant optical image out of panel 12 is compressed by prism 19 and applied to panel 13, and the resultant image out of panel 13 is compressed by prism 29 and applied to panel 14.

The functioning of these delay lines and the effect of prisms 18, 19, and 20 are explained in greater detail in my above identified copending application S.N. 130,010.

Assuming the prisms 18, 19, and 20 are properly related to the time delays between the four applied signals, then at some point along the Y axis of the system correlation between all four signals will be obtained. The correlation is detected by the analyzing polarizer 16, and the integration of the light output from polarizer 16 on photoconductive screen 17. The point of maximum integrated light output of the system along the Y axis of the screen 17 is therefore a function of the time delays between signals.

Considering the application of this system to radar, in FIG. 1, four spaced receiving antennae, are designated as $R_1$, $R_2$, $R_3$, and $R_4$, providing the inputs through receiver 22 to stages 14, 13, 12 and 11 respectively of correlator 10. The physical spacings between the antennae are indicated by $d$, and it is assumed for purpose of illustration that a signal reflected from a target is arriving at the antennae from a bearing of angle $\theta$. As is understood in the radar art, the signal arriving at antenna $R_1$ is delayed from that arriving at $R_2$, the signal at $R_2$ is delayed with respect to that at $R_3$, and the signal at $R_3$ is delayed with respect to that at $R_4$. The delays are a function of the distances $d$ and the angle $\theta$, and the delay for example between $R_1$ and $R_2$ is proportional to $d_{1,2}$ cos $\theta$. If the delay scales or image compressions effected by prisms 18, 19, and 20 are made proportional to the respective spacings $d_{1,2}$, $d_{2,3}$, and $d_{3,4}$, all four signals will combine coherently at some point along the Y axis of the delay lines 11, 12, 13, and 14, and the point on the Y axis where this occurs corresponds to cos $\theta$, and is therefore a measure of the bearing of the target.

The correlation information obtained by integrating the light output from polarizer 16 on photosensitive screen 17, can be read out by incorporating screen 17 in a television camera tube. Thus, by electronic scanning of the screen the bearing of the target can be ascertained.

If the target is moving relative to the antenna array, the light incident on the screen 17 has a Doppler modulation. It is preferred that the time of integration of the photoconductor used for screen 17 be short compared with the Doppler frequency. When the screen 17 is read by electronic scanning, the output signals may be reconstituted by means of a tapped delay line, with the delay between taps equal to the period of scan. These signals will be the correlation function of the four radar signals converted from the space domain of screen 17 to the time domain, with the Doppler frequency superimposed. This correlation function signal can be readily analyzed for the Doppler frequency, hence providing a measure of target velocity.

In addition to measuring target bearing and velocity, FIG. 1 includes means for measuring the target range, comprising an additional solid delay line panel 30, similar to lines 11, 12, 13 and 14. Like the previously described panels, panel 30 includes an electro-sonic transducer 30A positioned along one edge, and an acoustic or sonic energy absorber 30B located along the opposite edge, so that sonic energy introduced to line 30 by transducer 30A travels down the line or panel in the direction indicated by arrow W until it reaches 30B, where it is absorbed. The panel 30 is sandwiched between crossed polarizers 31 and 15 in order to analyze the modulation induced in the light beam 21 by the sonic stresses present in line 30 as a result of the signal applied thereto, as explained above. In addition, one may employ a quarter wave plate 32 in the system for control of the stress-optical characteristics of the system, as more fully explained in my said copending application S.N. 130,010. Also included is an optical image expanding prism 33, adapted to expand the light output pattern from line 30 relative to line 11 on the Y axis.

Delay line panel 30 is tilted or angularly rotated on the axis of light beam 21 relative to panels 11, 12, 13, and 14 by an angle $\phi$, as shown in FIG. 3, in order that a signal applied to line 30 and traveling down it in the direction of arrow W will have both an X and a Y component. The angle $\phi$ may be chosen to have any convenient value, such as say 30°, so long as it is not 0° or 90°. The amount of expansion of the Y axis scale effected by prism 33 is chosen and related to the angle $\phi$ so that the effective scale of the Y axis component of a signal moving down line 30 in direction W is equal to that of a signal moving down line 11 in direction Y. In other words, the expansion of the Y axis scale of line 30 relative to line 11 is chosen so that if a signal were applied simultaneously to transducers 30A and 11A, the signal on line 30 as imaged on line 11 through prism 33 would move in unison with the signal on line 11 along the Y axis. Of course, there is a movement of the signal on line 30 as imaged on line 11 relative to the signal on line 11 on the X axis. It is this latter movement which can be used to provide a measure of target range.

Thus, to obtain a measure of target range, coincident with the transmission of a radar signal from transmitter 60, that signal is applied to transducer 30A, from whence it is coupled into line 30, and begins to travel down the line in the direction of arrow W, with components on both the X and Y axes. At some time thereafter an echo of the transmitted signal is for example first received at antenna $R_4$ and coupled to stage 11 of correlator 10; thereafter the echo signal is received at antenna $R_3$ and coupled into stage 12; then it is received at antenna $R_2$ and coupled into stage 13; and finally it is received at antenna $R_1$ and coupled into stage 14. At the time of receipt of the echo signal at antenna $R_4$ and the application thereof to stage 11, the signal on delay line 30 will have traveled a certain distance along the length thereof, which corresponds to the time delay between transmission and reception of the radar signal, in other words the range of the target. This distance can be related to the X axis, and the point of intersection of the optical projection of the line 30 signal on the line 11 signal, read in terms of its position on the X axis becomes an indication of target range. Since the delay scale of line 30 is effectively adjusted relative to the Y axis by prism 33 to be equal to the Y axis delay scale of line 11, said point of intersection remains stationary on the X axis as both signals move upwardly in unison on the Y axis.

Due to the different effective delay scales for lines 11, 12, 13, and 14, eventually the echo signals on each of these lines move into registry and a correlation output is obtained as explained above. This complete multiple signal correlation now includes the signal on line 30, but only at the above stated point of intersection of the signals on lines 30 and 11. Thus, as the polarized light beam is modulated first by the signal on line 30, and then successively by the signals on lines 11, 12, 13, and 14, and then finally analyzed by polarizer 16 and integrated on screen 17, a maximum integrated spot of light is obtained as the correlation output on screen 17 of all five electrical inputs. The position of this point on screen 17 along the Y axis represents the time delays between the several antennae in receipt of the echo signal, and therefore is a measure of target bearing. The position of this correlation point on screen 17 along the X axis represents the time between transmission of the radar signal and receipt thereof at antenna $R_4$, and hence is a measure of target range.

A more detailed analysis of the relation of delay line 30 to delay line 11 is given with particular reference to FIGS. 2 and 3. The lines 30 and 11 are located relatively to each other so that their planes intersect at an angle $\alpha$ and the direction of the sonic velocity in the delay line 30 indicated by arrow W makes an angle $\phi$ with the projection of delay line 11 on the plane of delay line 30. As shown in FIG. 3, if C is the velocity of the sonic wave in the delay line medium, the component of that velocity parallel to the projection of delay line 11 on the plane of line 30 is $$C \cos \phi \tag{1}$$

And parallel to the X axis it is $$C \sin \phi \tag{2}$$

From FIG. 2 it is seen that the intercept of a light beam 21 is shorter on delay line 30 than on delay line 11; that is the velocity is effectively or apparently greater on delay line 30 than on delay line 11, the ratio being $\cos \alpha$. The velocities of the sonic wave in delay line 11 and the component of the sonic wave parallel to the Y axis in delay line 30, are equal when $$C \cos \alpha = C \cos \phi \tag{3}$$

Under this condition the relative velocity vector between the sonic waves is parallel to the X axis and is equal to $$C \sin \phi \tag{4}$$

When the condition of Equation 3 exists and the system is used to measure radar range, the range measurement appears along the X axis and its scale corresponds to the relative velocity of Expression 4.

In the foregoing description of the technique for combining the signals coherently from several spaced antenna elements, it has been assumed that the target is in the far-field, that is that the delay error incurred by assuming that the distance of the target was the same for all the antenna elements was substantially smaller than the delay resolution capability of the system. It is possible by a minor modification to take care of targets in the near-field without error.

The accurate expression for the time delay between the echo signal as received at antenna $R_1$ and as received at $R_2$ is $$1 - \sqrt{1 - \frac{2d_{1,2}}{R} \cos\phi + \frac{d_{1,2}^2}{R^2} \cos^2 \phi} \tag{5}$$

or, to second order approximation $$\frac{d_{1,2}}{R} \cos \phi - \frac{d_{1,2}^2}{R^2} \cos^2 \phi \tag{6}$$

In view of the fact that range appears in the system of FIG. 1 along the X axis, it is possible to design the optical system between the delay lines so as to vary along the Y axis and reflect the exact Expression 5 instead of the approximate one $d_{1,2} \cos \theta$ mentioned earlier. The shape of the prism, for instance, could be slightly distorted instead of remaining constant along the X axis.

The foregoing specific embodiment of the invention is presented merely by way of example, and various modifications thereof will be apparent to those skilled in the art. For example, four delay lines are utilized in the correlator 10. Obviously there may be a greater or lesser number used depending on the number of signals to be correlated. Also, for purposes of illustration prisms are shown for varying the effective delay scales of the delay lines relative to each other. Lenses may be used to the same effect, as shown in my said copending application S.N. 130,010. Alternatively, if only two signals are to be correlated in system 10, no effective change scale therebetween need be employed, but the time delay between the two signals may be ascertained by having the signals move in opposite directions along their respective delay lines, as also shown in my said copending application. It is also apparent that the correlation function herein described can be obtained with the use of pulse energy signals, or continuous signals, and even random noise signals. Other optical correlation methods and systems may be used in place of that specifically illustrated.

It is therefore understood that the herein described specific embodiment of the present invention is presented merely by way of example to facilitate a complete understanding of the invention, and such modifications, changes, or variations as are embraced by the spirit and scope of the appended claims, are contemplated as within the purview of the present invention.

What is claimed is:

1. A system for correlating signals relating to two parameters of information, comprising a two-dimensional electro-optical sonic delay line correlator for correlating at least two signals along one dimensional axis of said correlator, and a two-dimensional electro-optical sonic delay line means for correlating a third signal with the first-mentioned signals, the two dimensional axes of said delay line means being oriented at an angle other than 0° or 90° relative to the corresponding axes of said correlator, whereby a signal on said delay line means is provided with a component corresponding to each of the two dimensions of said correlator.

2. A system as set forth in claim 1, and further including means for effectively equating the rate of travel of a signal along a first dimensional axis of said correlator with the rate of travel of the component of a signal along said delay line means corresponding to said first dimensional axis.

3. A system as set forth in claim 1, wherein said correlator includes means for correlating more than two signals.

4. A system as set forth in claim 1, wherein said two signals are derived from a radar echo signal received at two spaced antennae, and said third signal is derived from the transmitted radar signal of said echo signal.

5. A correlator comprising first, second and third birefractive transparent sonic delay line panels, each having an electro-sonic input transducer positioned along an edge of the panel corresponding to a first dimension of the panel for coupling an electrical signal into the panel and causing it to travel down the panel along a second dimension of the panel, means for passing a polarized beam of light transversely through the three panels serially whereby said light is modulated successively by the sonic energy signals on said lines, means for analyzing the modulated beam of light to detect the modulation thereof, and means for integrating with respect to time the detected modulation to provide a correlation output of the signals on said three panels, said first and second panels being positioned to correlate two signals along one axis, said third panel being oriented with the axis of its said second dimension occupying an angle other than 0° or 90° with respect to said one axis, whereby a signal traveling down said third panel second dimension axis has a component parallel with said one axis and a component transverse to said one axis, whereby correlation between the signals on said first two delay panels can be measured along said one axis, and correlation of the signal on said third delay line with the signals on said first two delay lines can be measured along said transverse axis.

6. A correlator as set forth in claim 5, and further including means for effectively equating the rate of travel of a signal on said first delay panel along said one axis with the rate of travel of said parallel component of a signal on said third delay panel.

7. A correlator as set forth in claim 5, and further including a fourth birefractive transparent sonic delay line panel cooperating with said first and second panels for correlating an additional signal with the signals on said first and second panels along said one axis.

8. A correlator as set forth in claim 5, wherein said analyzing means is a polarizer panel whose polarization plane is crossed at right angles to the plane of polarization of said light beam when unmodulated.

9. A correlator as set forth in claim 8, wherein said integrating means is a photoconductive panel.

10. A correlator as set forth in claim 9, and further including means for effectively equating the rate of travel of a signal on said first delay panel along said one axis, with the rate of travel of said parallel component of a signal on said third delay panel.

11. A correlator as set forth in claim 10, and further including a fourth birefractive transparent sonic delay line panel cooperating with said first and second panels for correlating an additional signal with the signals on said first and second panels along said one axis.

12. A correlator as set forth in claim 5, and further including means for transmitting a radar signal, means for coupling said transmitted radar signal to the transducer of the third delay panel, two spaced antennae for receiving the echo signal of said transmitted radar signal, and means for coupling the echo signal as received at said two antennae respectively to said first and second delay panel transducers.

13. A correlator comprising first and second transparent, birefractive, sonic delay lines, each delay line having means for applying signals thereto in sonic energy form and causing said signals to travel down said line, means for applying a beam of light serially through said delay lines transversely to the line of travel of said signals, whereby said light is modulated by the sonic energy signals present on said delay lines, said first delay line being located adjacent said second delay line and in direct light transmissive relation thereto so that substantially all the light energy emergent from said first line is transmitted to said second line without material alteration thereof, means for analyzing and detecting said light modulation including a pair of crossed polarizers located in said beam of light and sandwiching the two delay lines therebetween, means for integrating with respect to time the detected modulation, means interposed between said lines for changing the dimension of the light pattern emergent from said first line along the dimension corresponding to the line of travel of signals in said lines, and the correlator further including a third transparent sonic delay line having means for applying signals thereto in sonic energy form and causing these signals to travel down said line, said beam of light being applied also through said third delay line transversely to the line of travel of said signals therein, means interposed between said second line and said third line for changing the dimension of the light pattern emergent from said second line along the dimension corresponding to the line of travel of signals in said lines.

14. A correlator as set forth in claim 13, wherein said three lines are oriented to cause said signals to travel along generally parallel lines of travel and in generally the same direction along said lines.

15. A method of determining the time delays between three signals having substantially similar waveforms, wherein said signals have known ratios of time delay therebetween, comprising effectively time delaying said signals relative to one another in accordance with said ratios, correlating the resultant signals, and detecting the relation of maximum correlation between all said signals relative to a reference scale as a measure of actual time delay between said signals.

16. A system for measuring a parameter of information embodied in the actual time delay between three or more signals which have substantially similar waveforms, and wherein said signals are all delayed relative to each other by predetermined ratios, comprising means for processing said signals in a manner to effect a relative delay of said signals inversely related to said information time delay, means for correlating all said signals with each other, and means for detecting the relation of maximum correlation between said signals relative to a reference scale definitive of actual time delay.

17. A system as set forth in claim 16, wherein said correlating means is an optical correlating means.

18. A system as set forth in claim 16, wherein said processing means comprises an electro-optical sonic delay line for each of said signals, said correlating means comprises a polarized light source providing a light beam passing serially through each of said delay lines, and said detecting means comprises a polarized light analyzer and a photo-responsive integrating means.

References Cited by the Examiner
UNITED STATES PATENTS

| | | |
|---|---|---|
| 2,418,964 | 4/47 | Arenber. |
| 2,664,243 | 12/53 | Hurvitz. |
| 2,897,351 | 7/59 | Melton. |
| 2,943,315 | 6/60 | Rosenthal _____ 343—13 X |
| 3,088,113 | 4/63 | Rosenthal _____ 343—17.1 |

CHESTER L. JUSTUS, *Primary Examiner.*